(12) United States Patent
Ishimaru

(10) Patent No.: US 7,903,170 B2
(45) Date of Patent: Mar. 8, 2011

(54) IMAGING APPARATUS

(75) Inventor: Makoto Ishimaru, Tokyo (JP)

(73) Assignee: Shinten Sangyo Co., Ltd., Tokyo (JP)

( * ) Notice: Subject to any disclaimer, the term of this patent is extended or adjusted under 35 U.S.C. 154(b) by 1012 days.

(21) Appl. No.: 11/699,343

(22) Filed: Jan. 30, 2007

(65) Prior Publication Data

US 2008/0094497 A1 Apr. 24, 2008

(30) Foreign Application Priority Data

Oct. 18, 2006 (JP) ................. 2006-309689

(51) Int. Cl.
*H04N 5/225* (2006.01)
*H01L 21/00* (2006.01)
*G02B 7/02* (2006.01)

(52) U.S. Cl. ......... 348/374; 348/340; 348/335; 438/106; 359/808

(58) Field of Classification Search .......... 348/373–374, 348/335, 340; 438/64, 66, 427, 428, 106, 438/116; 257/432, 433; 359/373–374, 335, 359/340, 808

See application file for complete search history.

(56) References Cited

U.S. PATENT DOCUMENTS

| | | | | |
|---|---|---|---|---|
| 7,391,457 B2 * | 6/2008 | Fujimoto et al. | ............... | 348/340 |
| 7,555,211 B2 * | 6/2009 | Go | ............... | 396/268 |
| 7,587,803 B2 * | 9/2009 | Montfort et al. | ............... | 396/529 |
| 7,746,582 B2 * | 6/2010 | Chiang | ............... | 359/823 |
| 2001/0012073 A1 * | 8/2001 | Toyoda et al. | ............... | 348/335 |
| 2001/0055073 A1 * | 12/2001 | Shinomiya | ............... | 348/374 |
| 2002/0131782 A1 * | 9/2002 | Yamaguchi et al. | ............... | 396/429 |
| 2002/0154239 A1 * | 10/2002 | Fujimoto et al. | ............... | 348/340 |
| 2003/0048378 A1 * | 3/2003 | Kim et al. | ............... | 348/375 |
| 2003/0107822 A1 | 6/2003 | Saito | | |
| 2004/0105173 A1 * | 6/2004 | Yamaguchi et al. | ............... | 359/793 |
| 2005/0141106 A1 * | 6/2005 | Lee et al. | ............... | 359/808 |
| 2005/0179805 A1 * | 8/2005 | Avron et al. | ............... | 348/340 |
| 2005/0200979 A1 * | 9/2005 | Nishihara et al. | ............... | 359/819 |
| 2006/0219885 A1 * | 10/2006 | Kinoshita et al. | ............... | 250/239 |

FOREIGN PATENT DOCUMENTS

| | | | |
|---|---|---|---|
| JP | 2002-10118 A | | 1/2002 |
| JP | 2003-149549 A | | 5/2003 |
| JP | 2004-147032 | * | 5/2004 |
| JP | 2006-227270 A | | 8/2006 |

* cited by examiner

*Primary Examiner* — Nhan T Tran
(74) *Attorney, Agent, or Firm* — Smith Patent Office

(57) ABSTRACT

An imaging apparatus includes a lens unit to be mounted in one-touch on a module unit affixed by reflow soldering or the like to a base plate. When the lens unit is mounted in one-touch on the module unit, the conical outer circumferential surface of a tip-end part of a lens press-fitting part is in close contact with the inner circumferential surface of the conical concave part of the holder to regulate the coaxiality of the installed lens. A flange face of the lens is directly received and supported by the holder to regulate the parallelity with the imaging element and, in addition, when the lens unit is mounted in one-touch on the module unit, the barrel which is integrally formed with the lens press-fitting part is snap-locked onto the upper end part of the holder to ensure the fixing of the barrel.

5 Claims, 1 Drawing Sheet

IMAGING APPARATUS

BACKGROUND OF THE INVENTION

1. Field of the Invention

The present invention relates to an imaging apparatus employing a fixed focal length nonadjustable lens characterized in that a lens unit is mounted in one-touch by means of an automaton on a module unit affixed by reflow soldering or the like to a base plate.

2. Description of the Related Art

The solid-state imaging apparatus structures installable in mobile telephones, digital cameras, portable personal computers, vehicle-mounted cameras, surveillance cameras and endoscopes and so on have been developed in the prior art necessitate the provision of a focus-adjustment mechanism that inhibits the compacting of the apparatus and are fixed following focus adjustment using an adhesive or the like.

Conventional imaging apparatus such as this comprise a large number of small component parts, the assembly process thereof and the positioning of the imaging element and lens in the optical axis direction and the direction orthogonal to the optical axis, along with the position adjustment with the imaging element, necessitation the implementation of a large number of steps and significant cost.

Accordingly, although focal length nonadjustable imaging lens have been developed and the provision of a mechanism for adjustment during assembly in non-adjustable optical systems like this is unnecessary, the demand for a precision assembled structure in which the positioning of the imaging element and lens in the optical axis direction and the direction orthogonal to the optical axis and position adjustment with the imaging element and so on can be achieved in a one-touch mounting remains.

SUMMARY OF THE INVENTION

The present invention provides an imaging apparatus employing a fixed focal length nonadjustable in which a module unit in which a holder having a conical concave part is affixed by reflow soldering or the like to the inner-side surface of a base plate on which an imaging element is mounted and a lens unit in which a lens is attached by press-fitting to a lens press-fitting part of a barrel having a conical-shaped part in close contact with the conical concave part of the holder are configured to be fitted in one-touch by means of an automaton.

That is to say, the present invention provides an imaging apparatus of a precision assembled structure in which the positioning of the imaging element and lens in the optical axis direction and the direction orthogonal to the optical axis and position adjustment with the imaging element and so on can be achieved in a one-touch mounting.

An imaging apparatus employing a fixed focal length lens in which a module unit in which a holder having a conical concave part is affixed by reflow soldering or the like to the inner-side surface of a base plate on which an imaging element is mounted and a lens unit in which a lens is attached by press-fitting to a lens press-fitting part of a barrel having a conical-shaped part in close contact with the conical concave part of the holder are configured to be fitted in one-touch by means of an automaton is provided.

In addition, an imaging apparatus configured so that, when the lens unit is mounted in one-touch on the module unit, a conical outer circumferential surface of a tip-end part of the lens press-fitting part is in close contact with an inner circumferential surface of the conical concave part of the holder to regulate the coaxiality of the installed lens is provided.

Furthermore, an imaging apparatus configured so that, when the lens unit is mounted in one-touch on the module unit, a flange face of the lens is directly received and supported by the holder to regulate the parallelity with the imaging element is provided.

Furthermore, an imaging apparatus configured so that, when the lens unit is mounted in one-touch on the module unit, the barrel integrally formed with the lens press-fitting part is snap-locked onto the upper end part of the holder to ensure the fixing of the barrel is provided.

The effects of the imaging apparatus pertaining to the present invention include afforded by the one-touch mountable configuring of a lens unit by way of an automaton on a module unit affixed by reflow soldering or the like to a base plate include a process shortening, reduction in number of component parts, a compacting of the apparatus, coaxiality and parallelity of the lens and imaging element, and a fixing of the barrel in one-touch by means of a snaplock without need for an adhesive or the like.

DESCRIPTION OF THE PREFERRED EMBODIMENTS

Figure 1:
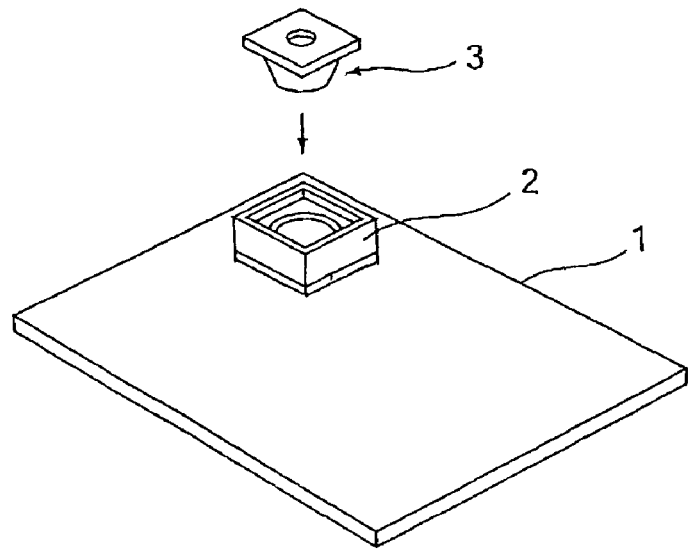
FIG. 1 is a perspective view of the mounted state of the lens unit and module unit of an imaging apparatus pertaining to the present invention.
Figure 2:
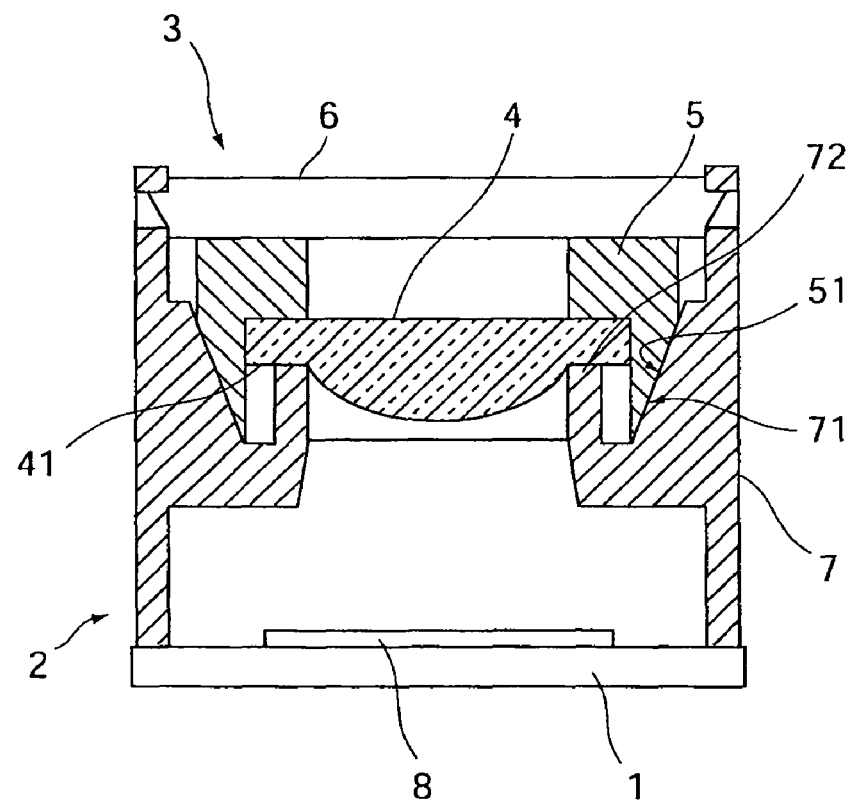
FIG. 2 is a cross-sectional view of one example of an imaging apparatus in which the imaging apparatus pertaining to the present invention has application.

An embodiment of the imaging apparatus of the present invention will be hereinafter described. FIG. 1 of the diagrams is a perspective view of the mounted state of the lens unit and module unit of an imaging apparatus pertaining to the present invention, and FIG. 2 is a cross-sectional view of one example of an imaging apparatus in which the imaging apparatus pertaining to the present invention has application.

FIG. 1, as a perspective view of the mounted state of the lens unit and module unit of an imaging apparatus pertaining to the present invention, shows a structure in which a lens unit 3 is mounted in one-touch as indicated by the arrow by way of an automaton (not shown in the diagram) on a module unit 2 affixed by reflow soldering or the like to a base plate 1.

The structure of this imaging apparatus will be further described with reference to a cross-sectional view of one example of an imaging apparatus in which the present invention shown in FIG. 2 has application.

When the lens unit 3 is mounted in one-touch on the module unit 2, the tip-end part of a cylindrical lens press-fitting part 5 is precision fitted into a conical-shaped part, and a conical-concave part is precision fitted onto the inner circumference of the holder 7.

The conical outer circumferential surface of a conical-shaped part 51 of the tip-end part of the cylindrical lens press-fitting part 5 is in close contact with the inner circumferential surface of a conical concave part 71 of the holder to regulate the coaxiality with the installed lens.

A lower face of a flange 41 of the lens 4 is directly accepted and supported by a lens receiver part 72 of a horizontally precision processed holder 7 to regulate the parallelity with the imaging element 8.

The imaging apparatus is additionally configured so that, when the lens unit 3 is mounted in one-touch on the module unit 2, a barrel 6 integrally formed with the lens press-fitting part 5 is snap-locked onto the upper end part of the holder 7 to ensure the fixing of the barrel 6.

What is claimed is:

1. An imaging apparatus employing a fixed focal length nonadjustable lens, comprising:
    a base plate;
    a module unit in which a holder having a conical concave part, said module unit is affixed by reflow soldering to the inner-side surface of the base plate on which an imaging element is mounted; and
    a lens having a barrel having a press-fitting part and a lens, said lens being attached to the press-fitting part of the barrel by press-fitting;
    wherein the lens press-fitting part of said barrel has a conical-shaped part to contact with the conical concave part of said holder so that the module unit and the lens unit are configured to be fitted in one-touch by an automaton.

2. The imaging apparatus according to claim 1, wherein when the lens unit is mounted in one-touch on the module unit, a conical outer circumferential surface of a tip-end part of the lens press-fitting part is in close contact with an inner circumferential surface of the conical concave part of the holder to regulate coaxiality of the installed lens.

3. The imaging apparatus according to claim 1, wherein when the lens unit is mounted in one-touch on the module unit, a flange face of the lens is directly received and supported by the holder to regulate parallelity with the imaging element.

4. The imaging apparatus according to claim 1, wherein when the lens unit is mounted in one-touch on the module unit, the barrel integrally formed with the lens press-fitting part is snap-locked onto the upper end part of the holder to ensure the fixing of the barrel.

5. The imaging apparatus according to claim 1, wherein a plurality of lens are press-fittable in the lens press-fitting part.

* * * * *